United States Patent
Fleischer et al.

(10) Patent No.: US 11,284,408 B2
(45) Date of Patent: Mar. 22, 2022

(54) SCHEDULING IN WIRELESS COMMUNICATION NETWORKS

(71) Applicant: NOKIA SOLUTIONS AND NETWORKS OY, Espoo (FI)

(72) Inventors: Marko Fleischer, Unterhaching (DE); Rene Röschke, Mammendorf (DE); Jan Hellmann, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/236,194

(22) Filed: Apr. 21, 2021

(65) Prior Publication Data

US 2021/0345349 A1 Nov. 4, 2021

(30) Foreign Application Priority Data

May 4, 2020 (FI) .................................... 20205456

(51) Int. Cl.
*H04W 72/08* (2009.01)
*H04W 72/04* (2009.01)
*H04W 72/12* (2009.01)

(52) U.S. Cl.
CPC ....... *H04W 72/082* (2013.01); *H04W 72/048* (2013.01); *H04W 72/0473* (2013.01); *H04W 72/1231* (2013.01)

(58) Field of Classification Search
CPC ........... H04W 72/082; H04W 72/0473; H04W 72/048; H04W 72/1231
See application file for complete search history.

(56) References Cited

U.S. PATENT DOCUMENTS

| | | | |
|---|---|---|---|
| 2009/0179755 A1* | 7/2009 | Bachl | H04W 72/082 340/540 |
| 2014/0073342 A1* | 3/2014 | Lioulis | H04W 72/082 455/452.2 |
| 2018/0359048 A1* | 12/2018 | Stephenne | H04L 1/0036 |
| 2018/0368077 A1* | 12/2018 | Laporte | H04W 24/06 |
| 2019/0320444 A1* | 10/2019 | Hakanson | H04W 72/082 |
| 2021/0160746 A1* | 5/2021 | Diggins | H04W 36/0061 |

FOREIGN PATENT DOCUMENTS

| | | |
|---|---|---|
| GB | 2547648 A | 8/2017 |
| WO | WO 2017/093784 A1 | 6/2017 |
| WO | WO 2017/157461 A1 | 9/2017 |

OTHER PUBLICATIONS

Office Action dated Sep. 3, 2020 corresponding to Finnish Patent Application No. 20205456.
Communication of Acceptance under section 29a of Patents Decree dated Mar. 3, 2021 corresponding to Finnish Patent Application No. 20205456.

* cited by examiner

*Primary Examiner* — Kevin M Cunningham
(74) *Attorney, Agent, or Firm* — Squire Patton Boggs (US) LLP

(57) ABSTRACT

To take into account a passive intermodulation, resource blocks are associated with information indicating passive intermodulation impact of a corresponding resource block. The resource blocks are scheduled using the information.

18 Claims, 4 Drawing Sheets

SCHEDULING IN WIRELESS COMMUNICATION NETWORKS

TECHNICAL FIELD

Various example embodiments relate to wireless communications and, particularly, to scheduling in wireless communication networks.

BACKGROUND

Wireless communication systems are under constant development. With the rapid development and expansion of wireless communication networks utilizing frequency duplex division (FDD), one feature which may affect to the performance is passive intermodulation (PIM) distortion. The passive intermodulation distortion can interfere with intended communications signals limiting the capacity and range of a communications system. Even higher order, for example third or fifth order, products of the passive intermodulation distortion could cause the performance degradation on the received signals.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided a scheduler comprising at least one processor; and at least one memory including computer program code, the at least one memory and computer program code configured to, with the at least one processor, cause the scheduler to perform: maintaining or accessing information associating resource blocks with information indicating passive intermodulation impact of a corresponding resource block; and scheduling resource blocks for transmission over a radio interface using the information.

In an embodiment, the at least one memory and computer program code configured to, with the at least one processor, cause the scheduler to perform the scheduling among resource blocks having no passive intermodulation impact as long as such resource blocks are available.

In an embodiment, the at least one memory and computer program code configured to, with the at least one processor, cause the scheduler to perform scheduling, when no resource blocks having no passive intermodulation impact is available, resource blocks starting from a resource block associated with the lowest passive intermodulation impact towards resource blocks having the highest passive intermodulation impact.

In an embodiment, the at least one memory and computer program code configured to, with the at least one processor, cause the scheduler to perform the scheduling among resource blocks having passive intermodulation impact.

In an embodiment, the at least one memory and computer program code configured to, with the at least one processor, cause the scheduler to perform defining the information associating resource blocks with information indicating passive intermodulation impact of a corresponding resource block based on measurement results performed at a site providing the radio interface and predefined information indicating passive intermodulation impact of a corresponding resource block based.

In an embodiment, the information indicating passive intermodulation impact of a corresponding resource block is at least for resource blocks having passive intermodulation impact a value indicating severity of the passive intermodulation impact.

In an embodiment, the scheduler is a downlink scheduler.

In an embodiment, the at least one memory and computer program code configured to, with the at least one processor, cause the scheduler to perform for downlink: maintaining or accessing information associating at least some resource blocks associated with passive intermodulation impact with information indicating downlink power adjustment; and adjusting, in response to scheduling a downlink resource block associated with the information indicating downlink power adjustment, downlink transmission power as indicated.

In an embodiment, the scheduler is an uplink scheduler.

In an embodiment, the at least one memory and computer program code configured to, with the at least one processor, cause the scheduler to perform for uplink: scheduling resources for user equipments by starting from user equipments locating at a cell edge of a cell providing the radio interface.

In an embodiment, the at least one memory and computer program code configured to, with the at least one processor, cause the scheduler to perform using downlink scheduling information when scheduling uplink resources.

In an embodiment, the information associating resource blocks with information indicating passive intermodulation impact at least indicates whether the resource block is in a carrier section having no passive intermodulation impact or in a carrier section having passive intermodulation impact.

According to an aspect there is provided a method comprising: maintaining or accessing information associating resource blocks with information indicating passive intermodulation impact of a corresponding resource block; and scheduling resource blocks for transmission over a radio interface using the information.

According to an aspect there is provided an apparatus comprising means for: maintaining or accessing information associating resource blocks with information indicating passive intermodulation impact of a corresponding resource block; and scheduling resource blocks for transmission over a radio interface using the information.

According to an aspect there is provided a computer program comprising instructions which, when the program is executed by one or more processors, cause the one or more processors to carry out at least: maintaining or accessing information associating resource blocks with information indicating passive intermodulation impact of a corresponding resource block; and scheduling resource blocks for transmission over a radio interface using the information.

According to an aspect there is provided a non-transitory computer-readable storage medium storing one or more instructions which, when executed by one or more processors, cause the one or more processors to carry out at least: maintaining or accessing information associating resource blocks with information indicating passive intermodulation impact of a corresponding resource block; and scheduling resource blocks for transmission over a radio interface using the information.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
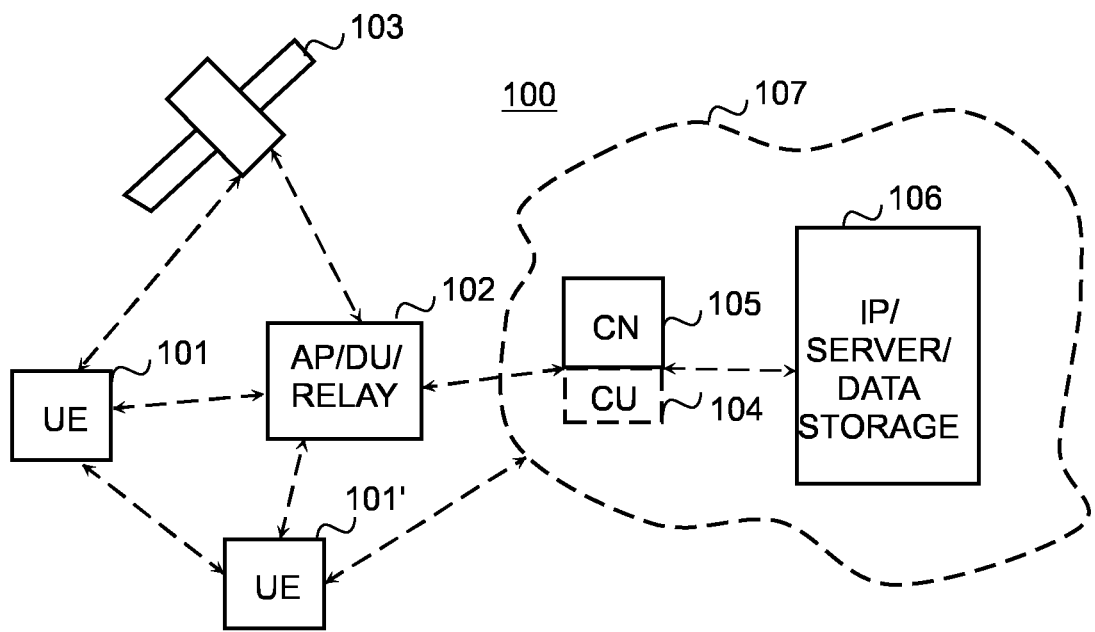
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g) NodeB) 102 providing the cell. The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node, host, server or access point (AP) etc. entity suitable for such a usage.

A communications system 100 typically comprises more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as relay nodes, for example distributed unit (DU) parts of one or more IAB nodes, or other network elements, etc. At least one of the (e/g) NodeBs or may be a Home(e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g)

Node Bs, includes, in addition to Home (e/g) NodeBs (H(e/g) nodeBs), a home node B gateway, or HNB-GW (not shown in FIG. 1). A HNB Gateway (HNB-GW), which is typically installed within an operator's network may aggregate traffic from a large number of HNBs back to a core network.

Antenna networks comprising antenna units, cables, connectors, etc. are one source for the passive intermodulation distortion. Furthermore, components external to the antenna networks may cause passive intermodulation. Passive intermodulation and its products interfere with adjacent channels and may impede uplink transmission. In other words, it is possible that frequencies created by the passive intermodulation and its products fall into uplink channels, thereby disturbing reception of uplink signals sent from user equipments and causing desensitization on the uplink. Hence, the passive intermodulation can be a severe problem, especially if common receive and transmit antenna units are used in an antenna arrangement.

Figure 2:
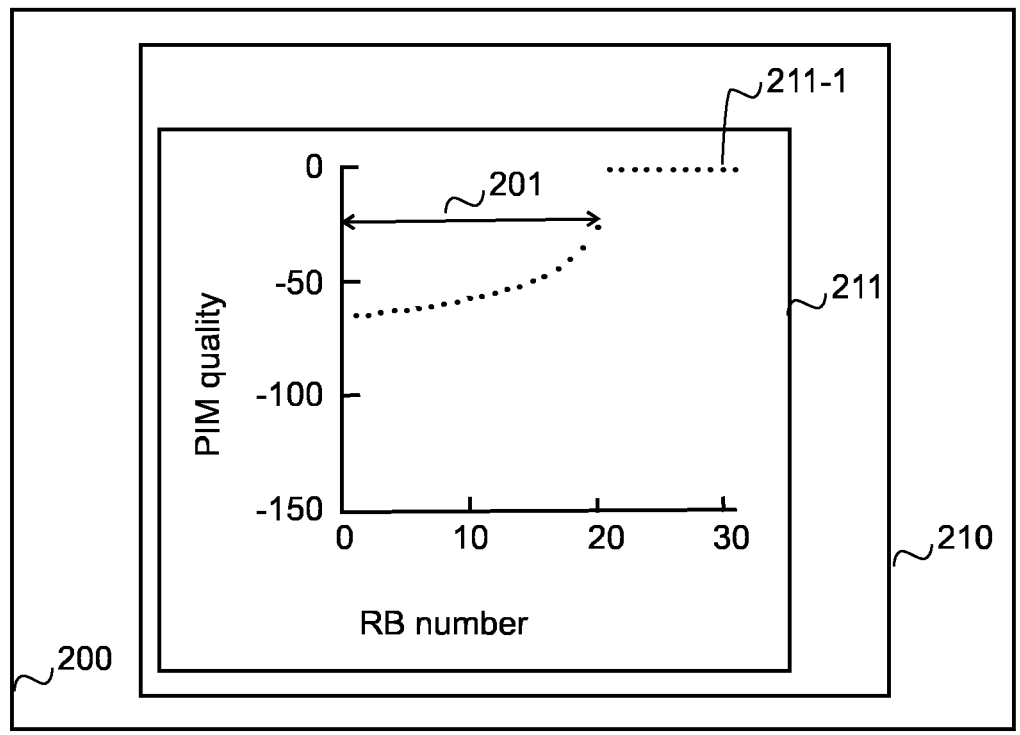
FIG. 2 illustrates an example of a scheduler.

FIG. 2 illustrates a simplified example of a scheduler (scheduler unit) configured to schedule at least downlink resources over a radio interface in a way which takes into account the passive intermodulation. It should be appreciated that FIG. 2 only shows some units, not all units, required for scheduling resources according to principles described below. For example, there may be a separate downlink scheduler and a separate uplink scheduler, or a scheduler configured to perform both downlink scheduling functionalities and uplink scheduling functionalities. Further, it should be appreciated that the scheduler may be comprised in an access node, not illustrated in FIG. 2, or in any apparatus configured to schedule resources over a radio interface.

Referring to FIG. 2, the scheduler 200 comprises, or have access, to a memory 210, to which information 211 indicating PIM (passive intermodulation) impact for resource blocks is stored. The memory 210 may comprise for the scheduler 200 information 211 indicating PIM impact for different carrier combinations, for example for one or more carriers in a single band and/or for carriers in multiple bands, possibly separately for uplink and downlink.

In the illustrated example, the information indicating the PIM impact is provided by associating each resource block (RB) with a PIM quality, or more precisely with a PIM quality weight 211-1. The PIM quality weight may be called a PIM quality tag, or a PIM quality indicator, or a PIM quality label. It is a value indicating predicted severity of the passive intermodulation impact. The illustrated weights are for downlink frequency range of the LTE 20 carrier in 1800 MHz band in a two carrier set-up with the LTE 5 in the same band, a weight of a resource block indicating the severity when the resource block is transmitted with other resource blocks in the set-up. Further, the weights indicate uplink PIM impact. The LTE 20 MHz carrier may be split into 100 resource blocks, but for the sake of clarity the weights are only shown partially, weight for resource blocks 31 to 99 are the same as weight for resource block 30, for example zero (no PIM impact). It should be appreciated that it suffices to have separate resource block-specific impact values for resource blocks within a critical section (critical zone) 201, and for the rest of the resource blocks a default value, i.e. no PIM impact, may be used. The critical section 201 is the downlink section within which there is some PIM impact to uplink transmissions, the rest of the resource blocks are in so called PIM impact free section. The PIM impact free section may be called a no PIM zone, or a PIM free zone or no PIM section, or a core zone. Further, the information indicating the PIM impact may be presented using a table instead of the coordinate-based system illustrated in FIG. 2. In the illustrated example, the smaller the weight value is, the bigger is the PIM impact. Naturally a reverse order may be used, i.e. the bigger the weight value is, the bigger is the PIM impact.

As can be seen from FIG. 2, resource blocks from 0 to about 20 have different weights, indicating severity of the PIM impact. This reflects that each resource block in the critical section 201 may have a different PIM quality weight due to the nonlinearity nature of the PIM and frequency distribution of resource blocks in the set-up. For the given example this means that about 83% of the total 125 resource blocks in the LTE 20 and LTE 5 can be concurrently used and yet an uplink service with no PIM impact can be realized.

It should be appreciated that a scheduler, when configured to perform scheduling according to two or more different set-ups, may comprise the information 211 set-up specifically. Naturally, an access node may comprise a plurality of schedulers, wherein a scheduler may be configured to perform scheduling according to one set-up and the access node is configured to select the scheduler based on the set-up currently in use.

Figure 3:
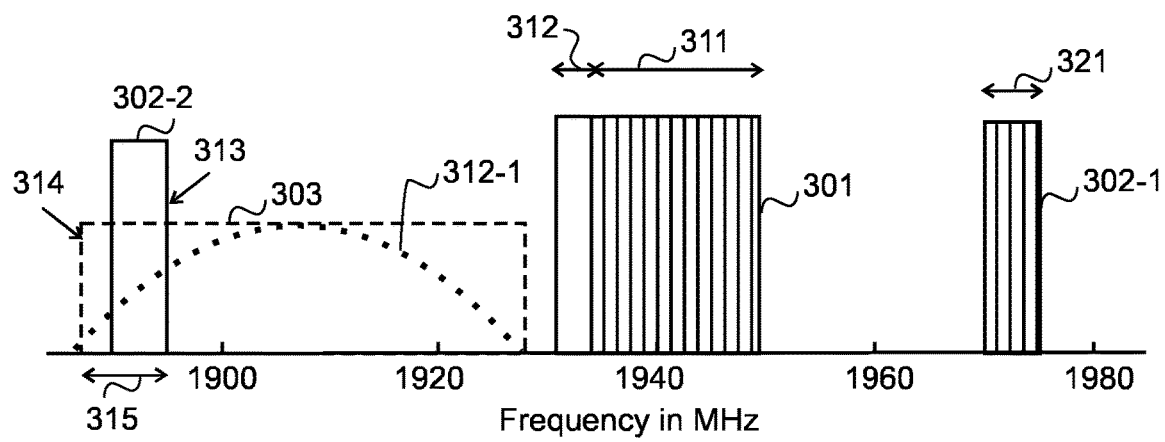
FIGS. 3, 4 and 5 illustrate examples of passive intermodulation over frequency ranges.
Figure 4:
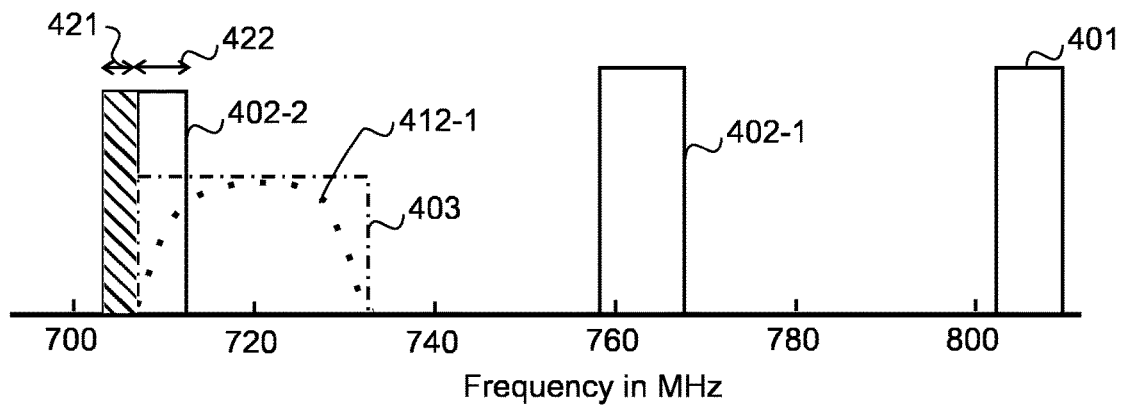
Figure 5:
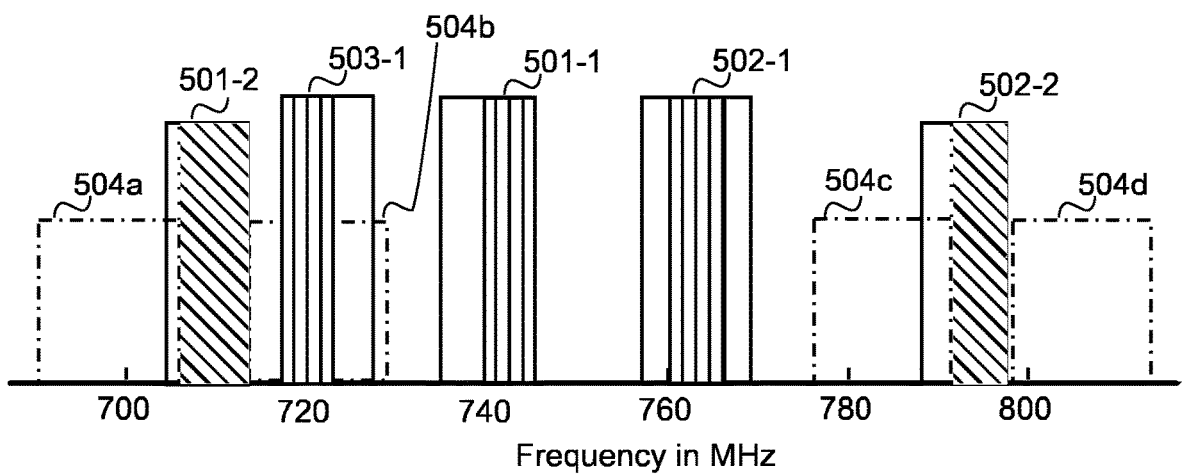

FIGS. 3 to 5 illustrate different examples on the passive intermodulation distortions, and visualizes the use of the information indicating PIM impact. In the illustrated examples, there are sections (zones) with no PIM impact. However, that may not always be the case, but even is such situations it is possible to minimize or optimize the PIM impact, as will be described below. Further, the examples use, for a sake of clarity, a passive intermodulation of a third order to illustrate the situation. It should be appreciated that similar principles apply to passive intermodulation of any order.

FIG. 3 illustrates an example of the two carrier set-up of LTE 20 and the LTE 5 in 1900 MHz band assuming that the same transmission power is used for each resource block. It should be appreciated that the illustrated situation can be used with any two carrier set-ups, and with a single carrier and with more than two carrier set-ups in a single band and in multi-band implementations.

Referring to FIG. 3, there are illustrated two downlinks 301, 302-1 and one uplink 302-2 hit by a passive intermodulation of a third order 312-1. As illustrated in FIG. 3, downlink transmissions 301 in the LTE 20 carrier comprises the PIM impact free section (zone) 311, illustrated by hashed portion of the downlink 301 of the LTE 20 carrier, and the critical section 312, illustrated by a non-hashed portion of the downlink 301 of the LTE 20 carrier. Difference between the sections is that PIM of any order caused by resource blocks in the PIM impact free section do not land in the uplink carrier, whereas PIM (of any order) caused by resource blocks in the critical section 312 lands in the uplink 302-2. It should be appreciated that FIG. 3 only illustrates the passive intermodulation of the third order with the specific set-up. The illustrated transmission in the LTE 5 carrier comprises the downlink transmissions 302-1 and uplink transmission 302-2 according to a standardized duplex gap for the frequency band used. As can be seen from FIG. 3, the downlink 302-1 of the LTE 5 carrier is a PIM impact free section 321, whereas the uplink 302-2 of the LTE 5 carrier is within a frequency range 303 where the passive intermodulation of the third order of the critical section 312 of the LTE 20 carrier downlink locates, the dotted line 312-1 illustrating a nonlinear PIM power distribution curve for downlink. (The non linear characteristic of the PIM power distribution is a consequence of the number of hits of different resource block combinations falling at frequency spots and characteristic of a PIM suppression capability of an antenna network over a frequency, resulting that in the middle area of the curve there are the highest power density peaks.) By performing the scheduling using principles illustrated in any of FIGS. 7 to 10, the situation can be taken into account and the PIM impact to the uplink minimized, or optimized.

The critical section 312 can be defined by calculating an offset 315 using the known operating frequencies, the frequency of the edge 313 of the uplink of the LTE5 carrier and the frequency of the edge 314 of the frequency range 303. The critical area 312 is half of the offset 315. When a resource block in the critical area 312 is used for downlink transmission in combination with any resource block(s) in the downlink 302-1 of the LTE 5 carrier, the uplink 302-2 of the LTE 5 carrier will always be hit by the passive intermodulation of the third order. At the simplest, the passive intermodulation of the third order may be defined to be 2F1-F2 and 2*F2-F1 with bandwidth of 2*BW1+BW2, wherein F1 is the first carrier having bandwidth BW1 and F2 is the second carrier having bandwidth BW2. Correspondingly, at the simplest, the fifth order may be defined to be 3*F1-2*F2 and 3*F2-2*F1 with bandwidth of 3*BW1+2*BW2, the seventh order may be defined to be 4*F1-3*F2 and 3*F2-3*F1 with bandwidth of 4*BW1+3*BW2, etc. (It should be appreciated that usually passive intermodulation analysis is more complex, but the simple examples are sufficient to illustrate principles).

Following example illustrates how the simplest solution may be used. If the first carrier 301 is LTE 20, it's occupied bandwidth is about 18 MHz, its downlink transmission center being at 1940 MHz, and uplink transmission center in 1860 MHz (not illustrated in FIG. 3), and the second carrier is LTE 5, it's occupied bandwidth is about 4.5 MHz, its downlink transmission 302-1 center being 1972.5 MHz and uplink transmission center 1892.5 MHz. The value of the edge 313 is the uplink transmission center of the LTE 5 plus half of the occupied bandwidth of the LTE 5, i.e. in the example 1894.75 MHz (1892.5 MHz+2.25 MHz). The value of the edge 314 is received by multiplying a first result of the downlink transmission center of the LTE 20 minus half of the its occupied bandwidth and then subtracting from the first result a second result of the uplink transmission center of the LTE 5 plus half of the occupied bandwidth of the LTE 5, i.e. the value of edge 313. In the example, the value of the edge 314 is 1887.25 MHz (2*(1940−9)MHz−(1972.5+2.25) MHz). The offset 315 is then 7.5 MHz (1894.75 MHz−1887.25 MHz), and hence the critical section 312 is 3.75 MHz (7.5 MHz/2) wide, from 1931 MHz (1940 MHz−9 MHz) to 1934.75 MHz (1931 MHz+3.75 MHz). A non-critical part, i.e. the PIM impact free section, for the LTE20 downlink is hence from 1934.75 MHz to 1949 MHz (=1940 MHz+9 MHz). The PIM impact free section for downlink is the sum of non-critical parts 311 and 321 of the two downlink carriers, i.e. altogether 18.75 MHz (18 MHz−3.75 MHz+4.5 MHz). It should be appreciated that in practice the critical section depends on the granularity of the resource blocks. For example, in the above example the granularity is 180 kHZ and the number of resource blocks required to cover the critical sections is 21, so the critical section is actually 3.78 MHz (=21*180 kHz).

FIG. 4 illustrates an example of the two carrier set-up of bands 20 and 28, both using LTE10 in uplink assuming that the same transmission power is used for each resource block. It should be appreciated that the illustrated situation can be used with any two carrier (band) set-ups, and with a single carrier, and with more than two carrier set-ups in a single band and in multi-band implementations.

Referring to FIG. 4, downlink transmissions 401 in the band 20 carrier has a frequency range 403 where a passive intermodulation of the third order of the downlink transmissions 401 in the band 20 and the downlink transmission 402-1 in band 28 locate, the dotted line 412-1 illustrating a nonlinear PIM power distribution curve for uplink. The frequency range 403 of the third order PIM partly overlaps with uplink transmissions 402-2 in the band 28 when (if) all downlink resource blocks of band 20 and 28 are used. The uplink PIM free section 421 defines a frequency range wherefrom uplink resource blocks are first to be scheduled, for example for user devices locating near a cell edge, for example, or having a weak signal for some other reason. Correspondingly, from the PIM critical section 422, resource blocks should be scheduled according to the uplink PIM impact value, as will be described below.

FIG. 5 illustrates an example in which there is a possibility that PIM can be avoided with a skillful selection of downlink resource blocks. This provides an uplink PIM free skeleton service possibility. In the illustrated example there is three bands and frequency sections that are PIM free in uplink or PIM impact free in downlink, and PIM critical downlink sections. Similar principles can be used with any carrier and band implementations in which there exists a possibility to any PIM free uplink section. FIG. 5 illustrates an even more complex example of 3 DL carriers and related 2 UL bands. Skillful selection of the DL RBs allows to have a UL PIM free skeleton service. This idea can be generalized for any carrier and band combinations in which there exists the possibility of a PIM free UL service. The PIM impact free sections in downlink are indicated by vertical hatch and the PIM free sections in uplink are indicated by diagonal hatch. In the illustrated example bands 29, 17 and 14 with LTE 10, i.e. occupied bandwidth 9 MHz are used. In the illustrated example, downlink transmissions 501-1 of the band 17 comprises a critical section (non-hatched section). Further, downlink transmissions 502-1 of the band 14 have two critical sections (non-hatched sections). The downlink transmissions 503-1 of the band 29 comprises a critical section (non-hatched sections). Permutations of all three bands (their critical section) and of any combinations of two of the bands cause a frequency range 504a of the PIM of the third order, overlapping partly (non-hatched section) with uplink transmissions 501-2 of the band 17, a frequency range 504b of the PIM of the third order, just at the edge of uplink transmissions 501-2 of the band 17, a frequency range 504d, not overlapping with uplink transmissions 502-2 of the band 14, and a frequency range 504c of the PIM of the third order, overlapping partly with uplink transmissions 502-2 of the band 14. Hence there is three PIM impact free sections, indicated by vertical hatching, for downlink transmissions, and two PIM free sections, indicated by diagonal hatching, for uplink transmissions. When scheduling downlink transmissions using resource blocks in the hatched sections, i.e. 501-1 of the band 17, 502-1 of the band 14 and 503 of the band 29, it is possible to use for uplink transmissions resource blocks in sections 501-2 and 502-2, which will be not hit by PIM of the third order.

As described by the above examples in FIGS. 3 to 5, the PIM impact free sections and/or the PIM free sections and/or PIM critical sections, and corresponding PIM quality weights can be pre-defined by calculating, for example manually and/or using one of plurality of applications available for scenario simulations.

Figure 6:
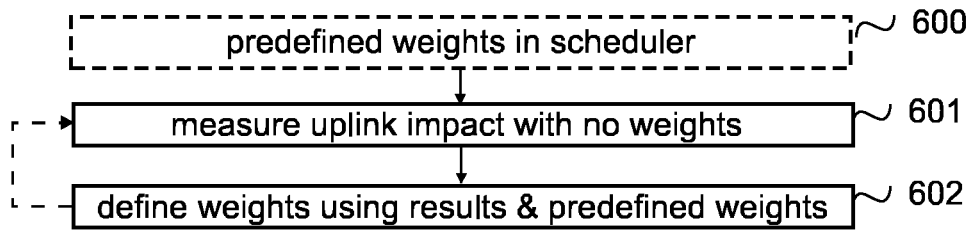
FIGS. 6 to 10 flow charts illustrating different examples of scheduler related functionalities.

FIG. 6 illustrates an example functionality of a scheduler configured to finetune (adjust) the predefined information indicating the PIM impact, based on real-time measurements, or measurements performed at certain intervals, or during initial calibration step. In the illustrated example of FIG. 6, the information indicating the PIM impact is different weight values.

Referring to FIG. 6, predefined weights at least for resource blocks in the PIM critical section have been inputted (block 600) to the scheduler as a parameter set for the scheduler. The predefined weights may be derived from the known carrier configuration including carrier bandwidth and carrier power, resource block power distribution, and other constraints. For example, the PIM impact in uplink depends on the PIM characteristics of the antenna network and the downlink output power of carriers.

To take into account environment's impact on the PIM, such as air induced PIM caused by permutations of carriers and obstacles near the antenna, for example metallic objects within 10 m distance from the antenna, and also the actual conducted PIM, uplink impact is measured in block 601 without using in the measurement transmissions any weight values, or using the same weight values for all downlink transmissions, and the weighs are defined in block 602 by using the measurement results and the predefined weights to calculate actual weight values. One may say that the predefined weights, which cover worst case scenario, are relaxed (adjusted) in block 602 according to the measurement results (measured curve). The theoretical PIM model, based on which the predefined weights are defined, is thereby enhanced to reflect the actual passive intermodulation caused by both conducted passive intermodulation and air induced passive intermodulation in a site the access node comprising the scheduler locates. For example, a PIM suppression capability/performance of a network, including antenna arrangements, can be taken in account. Further, the air induced passive intermodulation, which will be taken into account by performing the measurements, may be caused by different carrier permutations between carriers within an individual antenna and between carriers of different antennas. For example, in MIMO antenna arrangements, which comprise multiple antennas, air induced passive intermodulation may be caused by carrier combinations at the same frequency and at different frequencies. By measuring the uplink impact as described above, and adjusting the weights, scheduling can be synchronized both over an individual stream of the antenna arrangement and also over the entire MIMO streams of the antenna arrangement. To elaborate the situation, assume that downlink carriers TX1, TX2 and TX3 are part of a MIMO stream 1 from an antenna 1, and downlink carriers TX4, TX5, and TX6 are part of a MIMO stream 2 from an antenna 2 covering the same frequency ranges as TX1, TX2 and TX3, respectively, the antennas 1 and 2 belonging to the same antenna arrangement, and that conducted PIM overlapping (hitting) an uplink stream 1 is caused by TX1, TX2 and TX3. Air induced PIM overlapping (hitting) the uplink stream 1 can be caused by TX4, TX5 and TX6 because of TX4 and TX1, TX5 and TX2 and TX6 and TX3 covering the same downlink frequency range, respectively. By performing the process of FIG. 6 also the permutations of different carries will be taken into account when defining the actual weight values. In other words, both the conducted and air induced PIM effect to the actual parameter set, which will be used in scheduling.

As said above, blocks 601 and 602 may be repeated, or performed only once during calibration, prior to put the site in service.

The uplink impact may be measured, for example, when no user equipments are served (scheduled), for example when the access point is in a maintenance mode, and uplink power over frequency is measured when downlink transmission is turned on, and when downlink transmission is turned off (to obtain reference).

FIGS. 7 to 10 illustrate different scheduling principle examples assuming that the scheduler comprises, or have access to corresponding PIM weights, or at least information on PIM impact free section(s)/PIM free section(s). Further, in the examples the scheduling is performed to a resource block for a sake of clarity. It is straightforward for one skilled in the art to implement the disclosed scheduling principles examples to solutions in which two or more resource blocks are assigned simultaneously.

Figure 7:
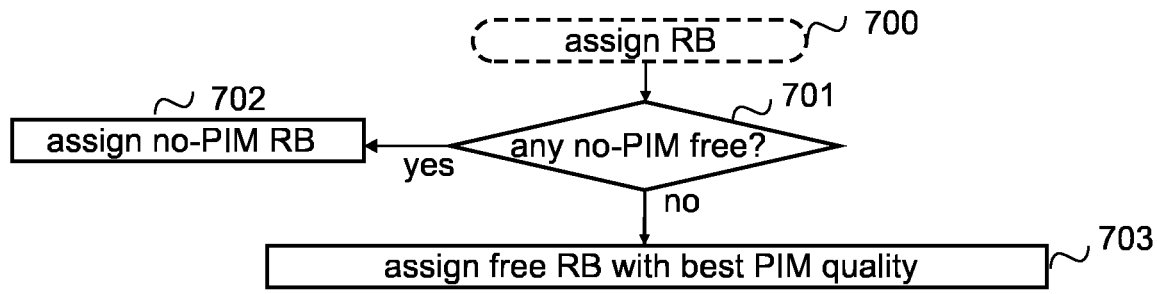

FIG. 7 illustrates functionality that may be performed only for downlink scheduling, only for uplink scheduling, or to both.

Referring to FIG. 7, when a resource block RB is to be assigned (block 700), it is checked in block 701, whether any of the free resource block is associated with information indicating no PIM impact. If there is (block 701: yes), one of the free resource blocks associated with the information indicating no PIM impact is assigned in block 702. If all resource blocks associated with information indicating no PIM impact are already assigned (block 701: no), then a free resource block associated with information indicating the best PIM quality is assigned in block 703. Using the example illustrated in FIG. 2, the smaller the PIM weight is the better the PIM quality is. Hence, the resource blocks in downlink are assigned using resource blocks in the PIM impact free section (zone) first, and resource blocks in the PIM critical section are assigned so that the PIM impact is minimized by assigning less critical resource blocks first, gradually selecting more critical ones. Hence, it is possible to avoid the PIM impact when the capacity provided the PIM impact free section is enough to provide the capacity needed, for example during low or medium usage of the network resources. Even during peak capacity requirements, the scheduling may provide better network behavior than randomly selecting the resource blocks. The same applies to scheduling in uplink, when resource blocks in the PIM free section(s) are scheduled first.

Figure 8:
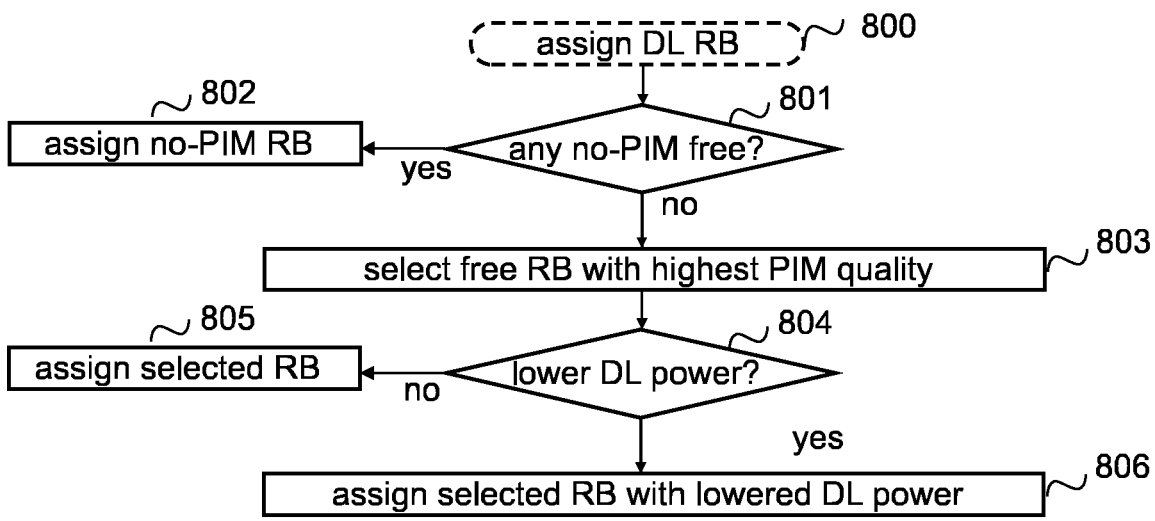

FIG. 8 illustrate an example functionality of a downlink scheduler. The downlink scheduler having the functionality can coexists with any kind of an uplink scheduler, including uplink schedulers not configured to take into account the PIM impact and uplink schedulers configured to take into account the PIM impact, for example as described with FIG. 7 or 9.

FIG. 8 illustrate scheduling principles for downlink in an implementation in which the PIM quality weights may be associated with information to lower (adjust) downlink transmission power. By lowering the transmission power of a resource block it is possible to reduce the PIM impact of the resource block. For example, a reduction of the transmission power may be proportional to an inverse of a corresponding weight value.

Referring to FIG. 8, when a resource block RB is to be assigned (block 800), it is checked in block 801, whether any of the free resource block is associated with information indicating no PIM impact. If there is (block 801: yes), one of the free resource blocks associated with the information indicating no PIM impact is assigned in block 802. If all resource blocks associated with information indicating no PIM impact are already assigned (block 801: no), then a free resource block associated with information indicating the best PIM quality is selected in block 803. Then it is checked in block 804, whether the selected resource block is associated with information indicating that downlink (DL) power is to be lowered. If not (block 804: no), the selected resource block is assigned in block 805. If the downlink power is to be lowered (block 804: yes), the selected resource block is assigned in block 806 and the downlink power is lowered in block 806 as indicated. The transmission power may be lowered for also other downlink resource blocks, since passive intermodulation is caused by plurality of downlink resource blocks. The lowered transmission power may be increased to original level, when no resource block used for downlink transmission is not associated with the information indicating that downlink (DL) power is to be lowered.

Figure 9:
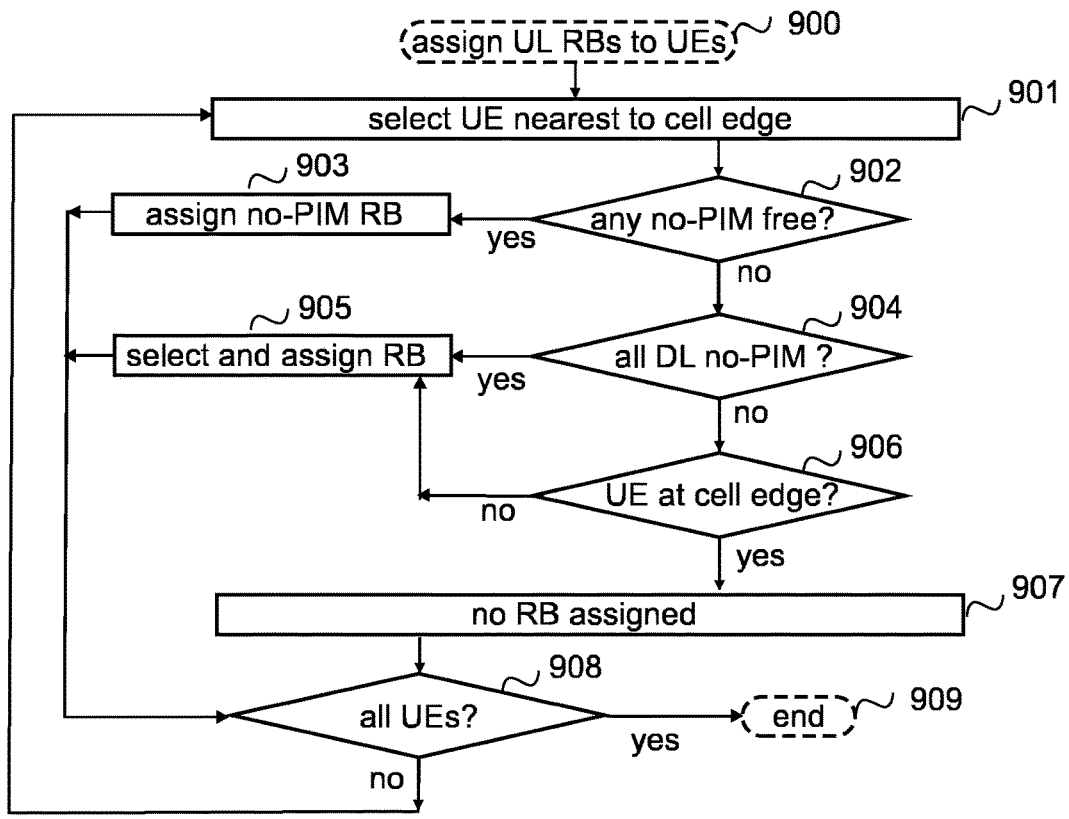

FIG. 9 illustrates scheduling principles in an uplink scheduler in an implementation in which resources are assigned to multiple user equipments (UE), and in which the uplink scheduler is aware of downlink scheduling. The scheduling principles used in the example is that scheduling starts from those user equipments that have the weakest transmission power in uplink, and that for certain user equipments no resource blocks are scheduled in case there is any risk for PIM impact. In the illustrated example it is assumed that the nearer of the cell edge a user equipment locates the weaker the power is, and at cell edge the power is so weak that no resource blocks are assigned if there is a risk for PIM impact. Further, for the sake of clarity, it is assumed that resource blocks are assigned one resource block per user equipment. It should be appreciated that similar principles apply when multiple resource blocks per user equipment are assigned.

Referring to FIG. 9, when uplink (UL) resource blocks RBs are to be assigned (block 900) to user equipments UEs, a user equipment nearest to the cell edge and which has not undergone the process described in FIG. 9 is selected in block 901. Then it is checked in block 902, whether any of the free uplink resource block is associated with information indicating no PIM impact. The information may be an indication that the resource block locates in a diagonal hatch area illustrated in FIG. 4 or 5. If there is (block 902: yes), one of the free uplink resource blocks associated with the information indicating no PIM impact is assigned in block 903 and the process continues to block 908 to check, whether all user equipments have undergone the process of FIG. 9. If not (block 908: no), the process continues to block 901 to select a user equipment nearest to the cell edge. If all user equipments have undergone the process of FIG. 9 (block 908: yes), the process ends (block 909).

If all uplink resource blocks associated with information indicating no PIM impact are already assigned (block 902: no), it is checked in block 904, using real-time information on downlink scheduling, whether all already assigned recourse blocks for downlink (DL) transmissions are associated with information indicating no PIM impact. If they are (block 904: yes), there is no risk for the PIM impact, and the process continues to block 905 to select a resource block and to assign the selected resource block. The selection and assignment may be performed as described above with block 703, i.e. a free uplink resource block associated with information indicating the best PIM quality is selected and assigned. However, the selection may be performed randomly, or using any other criteria. Then the process continues to block 908 to check, whether all user equipments have undergone the process of FIG. 9.

If one or more assigned resource blocks for downlink transmissions are associated with information indicating PIM impact, or the uplink scheduler is indicated in a different way that downlink scheduling is using PIM critical section, (block 904: no), it is then checked in block 906, whether the user equipment locates at the edge of the cell. (In other words, it is checked, whether the uplink transmission power is so weak that it is below a threshold given for "allowable uplink transmission"). If not (block 906: no), the process proceeds to block 905 to select and assign resource block If the user equipment locates at the cell edge (block 906: yes), in the illustrated example no resource block is assigned in block 907. Then the process continues to block 908 to check, whether all user equipments have undergone the process of FIG. 9.

Naturally, in other implementations different assignment principles may be used. For example, in an implementation, the uplink scheduler is not aware of real-time downlink scheduling, and therefore the checking in block 904 is omitted, and if all uplink resource blocks associated with information indicating no PIM impact are already assigned (block 902: no), the process proceeds directly to block 906. In still further implementations, the checks in blocks 904 and 906 may be omitted, and if all uplink resource blocks associated with information indicating no PIM impact are already assigned (block 902: no), the process proceeds directly to block 907 or block 905. In another implementation, the checking of block 906 is omitted and if one or more assigned resource blocks for downlink transmissions are associated with information indicating PIM impact (block 904: no), the process proceeds to block 907, i.e. no resource block is assigned. It should be appreciated that further variations to scheduling rules may be introduced.

Figure 10:
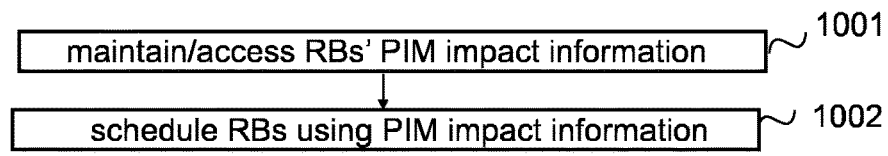

FIG. 10 illustrates a scheduling procedure at the simplest. The procedure may be performed for downlink scheduling, or for uplink scheduling, or for both downlink and uplink scheduling.

Referring to FIG. 10, the scheduler maintains in block 1001, or have accesses information associating resource blocks with information indicating passive intermodulation impact of a corresponding resource block, and schedules in block 1002 resource blocks for transmission over a radio interface using the information. For example, the scheduler may schedule in block 1002 resource blocks among resource blocks having no passive intermodulation impact as long as such resource blocks are available. An alternative scheduling principle minimizing PIM impact to uplink transmissions is to schedule in block 1002 downlink resource blocks from the PIM critical section(s), and not allowing scheduling downlink resource blocks in PIM impact free sections.

As is evident from the above examples, different optimization PIM strategies can be applied ranging from common DL/UL maximum capacity criteria or preventing PIM in certain UL carriers primarily via different PIM quality weights (weighting values). For example, uplink optimization may be to use a certain carrier in a band that has no PIM impact, and then a different DL scheduling concept and PIM quality weights may be used than in total UL capacity optimization.

Further, associating resource blocks, or at least downlink resource blocks, with information indicating a passive intermodulation impact, and using that information in scheduling, do not require much processing power and processing time when the scheduling is performed and yet the PIM impact can be minimized or optimized.

The blocks, related functions, and information exchanges described above by means of FIGS. 2 to 10 are in no absolute chronological order, and some of them may be performed simultaneously or in an order differing from the given one. Other functions can also be executed between them or within them, and other information may be transmitted, and/or other rules applied or selected. For example, PIM cancellation may be performed parallel to the above disclosed examples. Another example includes taking into account other scheduling rules, or indicators indicating signal quality, such as signal to noise ratio. when scheduling the resource blocks to uplink or downlink. Some of the blocks or part of the blocks or one or more pieces of information can also be left out or replaced by a corresponding block or part of the block or one or more pieces of information.

Figure 11:
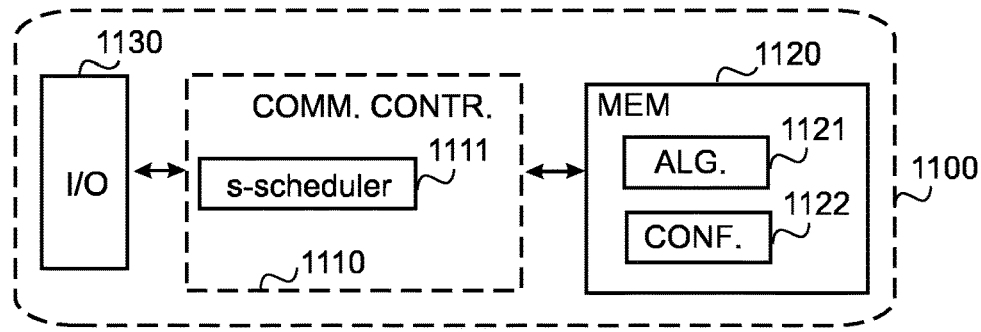
FIG. 11 is a schematic block diagram.

FIG. 11 illustrates an apparatus comprising a communication controller 1110, such as at least one processor or processing circuitry, and at least one memory 1120 including a computer program code (software, algorithm) ALG. 1121, wherein the at least one memory and the computer program code (software, algorithm) are configured, with the at least one processor, to cause the respective apparatus to carry out any one of the embodiments, examples and implementations described above. FIG. 11 illustrates an apparatus for a scheduler, which may be a downlink scheduler, an uplink scheduler or a combined scheduler performing downlink scheduling and uplink scheduling functionalities. The apparatus of FIG. 11 may be an electronic device.

Referring to FIG. 11, the memory 1120 may be implemented using any suitable data storage technology, such as semiconductor based memory devices, flash memory, magnetic memory devices and systems, optical memory devices and systems, fixed memory and removable memory. The memory may comprise a configuration storage CONF. 1121, such as a configuration database, for at least storing one or more configurations, including PIM impact weights and/or PIM impact free zones and/or PIM free zones and/or corresponding parameters/parameter values. The memory 1120 may further store, at least temporarily, scheduling information and/or configuration information. The memory 1120 may further store a data buffer for data waiting to be processed (including transmission).

Referring to FIG. 11, the apparatus for the scheduler comprises a communication interface 1130 comprising hardware and/or software for realizing communication connectivity according to one or more radio communication protocols. The communication interface 1130 may provide the apparatus with communication capabilities to user devices (terminal devices, user equipments) camping in one or more cells served by an access node comprising the scheduler. In an embodiment, the communication interface may comprise one or more antenna arrays providing the apparatus with capability of forming directive transmission radio beams and the reception radio beams. The communication interface may comprise standard well-known components such as an amplifier, filter, frequency-converter, (de)modulator, and encoder/decoder circuitries.

The communication controller 1110 comprises one or more smart scheduler (s-scheduler) processing circuitry 1111 configured to schedule downlink and/or uplink resources in a radio interface. The smart scheduler processing circuitry may, for example, configure the access node to perform downlink scheduling and/or uplink scheduling according to any one of the embodiments/examples/implementations described above. The communication controller 1110 may control the smart scheduler processing circuitry 1111 to receive the PIM impact weight, or corresponding information, and to use them to schedule resource blocks, and/or to calibrate the PIM impact weight, or corresponding information.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 10 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A scheduler comprising
at least one processor; and
at least one memory including computer program code, the at least one memory and computer program code configured to, with the at least one processor, cause the scheduler to perform:
maintaining or accessing stored information associating resource blocks with information indicating passive intermodulation impact of a corresponding resource block, wherein at least for some of the resource blocks the information is per a resource block; and
scheduling resource blocks for transmission over a radio interface using the information, wherein the at least one memory and computer program code are configured to, with the at least one processor, further cause the scheduler to perform:
defining the information associating resource blocks with information indicating passive intermodulation impact of a corresponding resource block based on both measurement results performed at a site providing the radio interface when no user equipments are served by the site and predefined information indicating passive intermodulation impact of a corresponding resource block, the predefined information being based on a theoretical passive intermodulation model associated with actual passive intermodulation caused by both conducted passive intermodulation and air induced passive intermodulation in the site.

2. The scheduler according to claim 1, wherein the at least one memory and computer program code are configured to, with the at least one processor, cause the scheduler to perform the scheduling among resource blocks having no passive intermodulation impact as long as such resource blocks are available.

3. The scheduler according to claim 2, wherein the at least one memory and computer program code are configured to, with the at least one processor, cause the scheduler to perform scheduling, when no resource blocks having no passive intermodulation impact is available, resource blocks starting from a resource block associated with the lowest passive intermodulation impact towards resource blocks having the highest passive intermodulation impact.

4. The scheduler according to claim 1, wherein the at least one memory and computer program code are configured to, with the at least one processor, cause the scheduler to perform the scheduling among resource blocks having passive intermodulation impact.

5. The scheduler according to claim 1, wherein the information indicating passive intermodulation impact of a corresponding resource block per a resource block is at least for resource blocks having passive intermodulation impact a value indicating severity of the passive intermodulation impact.

6. The scheduler according to claim 1, wherein the scheduler comprises a downlink scheduler.

7. The scheduler according to claim 6, wherein the at least one memory and computer program code are configured to, with the at least one processor, cause the scheduler to perform:
maintaining or accessing information associating at least some resource blocks associated with passive intermodulation impact per a resource block with information indicating downlink power adjustment; and
adjusting, in response to scheduling a downlink resource block associated with the information indicating downlink power adjustment, downlink transmission power as indicated.

8. The scheduler according to claim 1, wherein the scheduler comprises an uplink scheduler.

9. The scheduler according to claim 8, wherein the at least one memory and computer program code are configured to, with the at least one processor, cause the scheduler to perform scheduling resources for user equipments by starting from user equipments locating at a cell edge of a cell providing the radio interface.

10. The scheduler according to claim 8, wherein the at least one memory and computer program code are configured to, with the at least one processor, cause the scheduler to perform using downlink scheduling information when scheduling uplink resources.

11. The scheduler according to claim 8, wherein the information associating resource blocks with information indicating passive intermodulation impact at least indicates whether the resource block is in a carrier section having no passive intermodulation impact or in a carrier section having passive intermodulation impact.

12. A method, comprising:
  maintaining or accessing stored information associating resource blocks with information indicating passive intermodulation impact of a corresponding resource block, wherein at least for some of the resource blocks the information is per a resource block; and
  scheduling resource blocks for transmission over a radio interface using the information, further comprising:
  defining the information associating resource blocks with information indicating passive intermodulation impact of a corresponding resource block based on both measurement results performed at a site providing the radio interface when no user equipments are served by the site and predefined information indicating passive intermodulation impact of a corresponding resource block, the predefined information being based on a theoretical passive intermodulation model associated with actual passive intermodulation caused by both conducted passive intermodulation and air induced passive intermodulation in the site.

13. The method according to claim 12, wherein the scheduling comprises scheduling among resource blocks having no passive intermodulation impact as long as such resource blocks are available.

14. A method according to claim 13, wherein the scheduling comprises scheduling, when no resource blocks having no passive intermodulation impact are available, resource blocks starting from a re-source block associated with the lowest passive intermodulation impact towards resource blocks having the highest passive intermodulation impact.

15. A method according to claim 12, wherein the scheduling comprises scheduling among resource blocks having passive intermodulation impact.

16. The method according to claim 12, wherein the information indicating passive intermodulation impact of a corresponding resource block per a resource block is at least for resource blocks having passive intermodulation impact a value indicating severity of the passive intermodulation impact.

17. The method according to claim 12, wherein the method is performed on a downlink scheduler.

18. A computer program embodied on a non-transitory computer-readable medium, said computer program comprising instructions which, when executed by one or more processors, cause the one or more processors to carry out at least:
  maintaining or accessing stored information associating resource blocks with information indicating passive intermodulation impact of a corresponding resource block, wherein at least for some of the resource blocks the information is per a resource block; and
  scheduling resource blocks for transmission over a radio interface using the information, said computer program comprising instructions which, when executed by one or more processors, further cause the one or more processors to carry out at least:
  defining the information associating resource blocks with information indicating passive intermodulation impact of a corresponding resource block based on both measurement results performed at a site providing the radio interface when no user equipments are served by the site and predefined information indicating passive intermodulation impact of a corresponding resource block, the predefined information being based on a theoretical passive intermodulation model associated with actual passive intermodulation caused by both conducted passive intermodulation and air induced passive intermodulation in the site.

* * * * *